United States Patent
Kuschke et al.

(10) Patent No.: US 10,197,472 B2
(45) Date of Patent: Feb. 5, 2019

(54) METHOD FOR PERFORMING MAINTENANCE ON AN ENGINE

(71) Applicant: MTU Aero Engines AG, Munich (DE)

(72) Inventors: Jonathan Kuschke, Munich (DE); Anastasios Tsalavoutas, Kaisariani/Athen (GR); Andre Kando, Dachau (DE)

(73) Assignee: MTU Aero Engines AG, Munich (DE)

( * ) Notice: Subject to any disclaimer, the term of this patent is extended or adjusted under 35 U.S.C. 154(b) by 491 days.

(21) Appl. No.: 14/500,215

(22) Filed: Sep. 29, 2014

(65) Prior Publication Data

US 2015/0094931 A1    Apr. 2, 2015

(30) Foreign Application Priority Data

Sep. 30, 2013 (EP) .................................... 13186677

(51) Int. Cl.
*G01M 17/00* (2006.01)
*G06F 7/00* (2006.01)
(Continued)

(52) U.S. Cl.
CPC .............. *G01M 15/05* (2013.01); *F02C 9/00* (2013.01); *G05B 23/0283* (2013.01);
(Continued)

(58) Field of Classification Search
CPC ............. G01M 15/05; B08B 3/00; F02C 9/00
(Continued)

(56) References Cited

U.S. PATENT DOCUMENTS

| | | | |
|---|---|---|---|
| 6,155,038 A | * | 12/2000 | Irwin .................. F02C 9/28 415/17 |
| 2005/0096832 A1 | | 5/2005 | Takada et al. |

(Continued)

FOREIGN PATENT DOCUMENTS

| | | |
|---|---|---|
| EP | 1 160 712 | 12/2001 |
| EP | 1 914 010 | 4/2008 |
| EP | 1 983 158 | 10/2008 |

OTHER PUBLICATIONS

Ams(TM): "Gas Turbine Engine Performance", , Jan. 31, 2005 (Jan. 31, 2005), 4 pages, Found on the Internet: URL:http://www2.emersonprocess.com/siteadmincenter/PM Asset Optimization Documents/ProductWhitePapers/amspm_wp_GasTurbinePerf.pdf.

(Continued)

*Primary Examiner* — Mahmoud S Ismail
(74) *Attorney, Agent, or Firm* — Davidson, Davidson & Kappel, LLC (57) ABSTRACT

A method for performing maintenance on an engine includes: providing an engine maintenance system including a database system having a database and a database management device: providing a first performance parameter stored in the database and characterizes an engine performance before an engine maintenance procedure; providing a maintenance parameter stored in the database and characterizes a scope of a maintenance measure performed on an engine during an engine maintenance procedure; providing a second performance parameter stored in the database and characterizes the engine performance after the engine maintenance procedure; determining, using the database management device, a functional relationship between the maintenance parameter and the contribution of the maintenance parameter to a difference between the first performance parameter and the second performance parameter; outputting the functional relationship via the engine maintenance (Continued)

system; and performing maintenance on the engine taking the functional relationship into account.

20 Claims, 4 Drawing Sheets (51) Int. Cl.
G06F 11/30 (2006.01)
G06F 19/00 (2018.01)
G07C 5/00 (2006.01)
G01M 15/05 (2006.01)
G05B 23/02 (2006.01)
G06Q 10/00 (2012.01)
F02C 9/00 (2006.01)
G06G 7/70 (2006.01)

(52) U.S. Cl.
CPC ......... *G06Q 10/20* (2013.01); *F05D 2230/72* (2013.01); *F05D 2260/10* (2013.01); *F05D 2270/30* (2013.01); *F05D 2270/301* (2013.01); *F05D 2270/303* (2013.01); *F05D 2270/304* (2013.01); *F05D 2270/306* (2013.01); *F05D 2270/309* (2013.01)

(58) Field of Classification Search
USPC ...................................... 701/29, 100; 134/18
See application file for complete search history.

(56) References Cited

U.S. PATENT DOCUMENTS

| 2010/0003138 | A1* | 1/2010 | Siebers ................... F03D 80/55 416/146 R |
| 2010/0023369 | A1* | 1/2010 | Chapman ............... G06Q 10/04 701/101 |
| 2010/0116292 | A1* | 5/2010 | Wagner .................... B08B 3/00 134/18 |
| 2010/0280730 | A1* | 11/2010 | Page ........................ F02C 9/28 701/100 |

OTHER PUBLICATIONS

Schepers et al."Optimierung der on-line- und off-line-waesche an einer 26-MW Gasturbine unter besonderer Berucksichtigung der Leistungssteigerung," VGB Kraftwerkstechnik, VGB Kraftwerkstechnik GmbH. Essen, DE, Bd. 79, Nr. 3, Jan. 1, 1999, pp. 46-54, see English Abstract submitted herewith.

* cited by examiner

METHOD FOR PERFORMING MAINTENANCE ON AN ENGINE

This claims the benefit of European Patent application EP 13186677.4, filed Sep. 30, 2013 and hereby incorporated by reference herein.

The present invention relates to a method for performing maintenance on an engine, and to an engine maintenance system for use in such a method.

SUMMARY OF THE INVENTION

Maintenance measures performed on airplanes, helicopters, and other aircraft, are currently not, or only in expensive individual tests, analyzed for their effects on a change in engine efficiency. Alternatively, the efficiency of individual maintenance measures is estimated from tests performed during the development of mostly different types of engines. However, these estimated values are highly error-prone and, in addition, are generally only available to the manufacturer of the respective engine. Therefore, sometimes unnecessary maintenance measures are performed during engine maintenance and repair.

It is an object of the present invention to provide a method for performing maintenance on an engine, which allows for better planning of the scope of maintenance and enables maintenance to be performed more selectively. Another object of the present invention is to provide an engine maintenance system for use in such a method.

The present invention provides a method for performing maintenance on an engine. In accordance with the present invention, at least the following steps are performed: providing an engine maintenance system including a database system having a database and a database management device; providing at least one first performance parameter which is stored in the database and characterizes an engine performance before an engine maintenance procedure; providing at least one maintenance parameter which is stored in the database and characterizes a scope of a maintenance measure performed on an engine during an engine maintenance procedure; providing at least one second performance parameter which is stored in the database and characterizes the engine performance after the engine maintenance procedure; determining, using the database management device, a functional relationship between a maintenance parameter and the contribution of the parameter to a difference between the first performance parameter and the second performance parameter; outputting the functional relationship via the engine maintenance system; and performing maintenance on the engine taking the functional relationship into account. In other words, in accordance with the present invention, the efficiency and contribution of a particular maintenance measure, or of the scope of a particular maintenance measure, to the resulting increase in engine performance; i.e., the increase in engine performance that may be achieved by the respective maintenance measure, are functionally determined and taken into account in the planning of the type and scope of the engine maintenance and the performance thereof. In the context of the present invention, the term "maintenance" is understood to mean the servicing, repair, replacement and/or overhaul of one or more or all of the components of the engine concerned. In contrast to the prior art, the method according to the present invention enables sound assessment and prediction of the effect of a particular maintenance measure on the increase in engine performance, so that the type and scope of maintenance measures that may be performed during maintenance can be optimally selected to reliably achieve a particular target. Depending on the maintenance objectives, it is thereby possible to reduce maintenance and spare part costs since, for example, fewer new parts and spare parts are needed, and engines are not returned to the maintenance loop because of failing to pass the post-maintenance acceptance test. Through purposeful selection of the type and scope of maintenance measures, it is also possible to achieve improved performance level for the engine and to increase the service life of individual engine components. The entirety of maintenance measures to be carried out defines the overall scope of engine maintenance. In addition, based on the functional relationship determined individually for each maintenance measure, it is possible to make predictions for future maintenance procedures and for the effect of individual maintenance measures on the attainment of specific performance target levels.

In an advantageous embodiment of the present invention, the first performance parameter and/or the second performance parameter are/is determined using a monitoring system of the engine and/or using a performance test stand and are/is stored in the database. In other words, in accordance with the present invention, provision is made for at least one of the performance parameters to be advantageously determined from performance-relevant on-wing data from an engine monitoring system which is typically present anyway for engine and/or component performance analysis before and after maintenance. Alternatively or additionally, at least one of the performance parameters may also be determined using a performance test stand, for example in the case of an engine that has already been removed, for standardizing the measurement values or the like.

Further advantages are obtained when the first performance parameter and/or the second performance parameter are/is determined taking into account at least one parameter selected from the group of height, pressure, temperature, rotational speed, fuel mass flow, flight Mach number, air mass flow, efficiency, capacity, valve position, guide vane angle, clearance-maintaining position and vibrations in the turbine region of the engine and/or in the compressor. In this way, the performance to be improved or restored of the engine to be serviced can be determined particularly accurately taking into account its particular structural design. Preferably, the first and/or second performance parameter are/is determined taking into account at least the parameters of "rotational speeds of a low-pressure compressor shaft and a high-pressure compressor shaft", "fuel mass flow", "fuel temperature" and "exhaust gas temperature, measured upstream and downstream of a low-pressure turbine (depending on the engine type)."

Further advantages are obtained in that the at least one maintenance parameter characterizes a degree of a change in a feature of an engine component resulting from the maintenance measure and/or a degree of restoration of a feature of an engine component resulting from the maintenance measure and/or is determined taking into account a number of cycles that the engine component to be serviced has operated since a previous maintenance of the engine. In other words, provision is made for the maintenance parameter to characterize the scope of a maintenance measure that concerns a change in a particular characteristic, such as a change in tip clearances, surface roughnesses, leading edge radii, chord lengths, and the like. Alternatively or additionally, the maintenance parameter may characterize the scope of a maintenance measure that concerns the restoration of a particular characteristic. For example, the maintenance parameter may characterize that 20%, 30%, 50% or more of the existing rotor blades of the engine will be polished. It may also be provided that the number of cycles that an engine component has operated since a previous maintenance be taken into account by the maintenance parameter in the description of the engine's condition. Thus, the type and scope of the maintenance measures to be performed can be optimally planned according to the engine to be serviced and can be assessed prior to performing the maintenance in terms of their effects on the engine performance.

Further advantages are obtained when the first performance parameter and/or the second performance parameter and/or the maintenance parameter are/is available in the form of data of an already serviced engine stored in the database and/or are/is acquired on the engine to be serviced and stored in the database. In other words, for determining the functional relationship, parameters already existing in the database; i.e., "historical" data of previous maintenance procedures on the same engine and/or other engines, may be retrieved and used for determining the scope of maintenance of the specific engine to be serviced. Alternatively or additionally, some or all of the aforementioned parameters can be determined directly on the engine to be or having been serviced, either before, during and/or after the maintenance procedure. In this way, the database can be set up in a specific way for determining the functional relationship and may possibly be complemented with "historical" data of previous maintenance procedures.

Another advantageous embodiment of the present invention provides that the first performance parameter and/or the second performance parameter and/or the maintenance parameter be provided in relation to a type and/or a specimen and/or a stage and/or a stage cluster of the engine. In other words, for determining the functional relationship, provision is made for the database to be specifically adapted to a type or a particular specimen of the engine to be serviced. Alternatively or additionally, the aforementioned parameters may be clustered or related to a particular stage of the engine in order to simplify the determination of the functional relationship.

Further advantages are obtained by determining the functional relationship by means of a compensation calculation. This provides a particularly simple way of determining a functional relationship for the aforementioned parameters, which are each governed by a not exactly known geometrical, chemical and/or physical model. Through compensation calculation, it is possible, for example, to determine a linear relationship between a change in the clearance of a blade and the associated increase in engine efficiency. However, for certain maintenance measures, the functional relationship may in principle also be much more complex.

Further advantages are obtained when the functional relationship is determined for a plurality of maintenance parameters. This allows for particularly good assessment and prediction of the contribution of the associated maintenance measures to the overall maintenance result.

A second aspect of the present invention relates to an engine maintenance system for use in a method in accordance with the first inventive aspect. For this purpose, the engine maintenance system includes at least one database system having a database adapted to store at least one first performance parameter characterizing an engine performance before an engine maintenance procedure, at least one maintenance parameter characterizing a scope of a maintenance measure performed on an engine during an engine overhaul, and at least one second performance parameter characterizing the engine performance after the engine maintenance procedure. The engine maintenance system further includes a database management device adapted to access the database and to determine a functional relationship between the at least one maintenance parameter and the contribution of the maintenance parameter to the difference between the first performance parameter and the second performance parameter. Moreover, the engine maintenance system has an output device for outputting the functional relationship determined by the database management device in order for it to be taken into account in the maintenance of the engine. Thus, the engine maintenance system according to the present invention allows for better planning of the scope of maintenance and enables maintenance to be performed in an optimal manner, because the effect of a particular maintenance measure on the performance of the engine to be serviced can be assessed prior to maintenance and correspondingly taken into account in the planning and performance of the maintenance. Further attendant advantages and features thereof will become apparent from the description of the first inventive aspect. Advantageous embodiments of the first inventive aspect are considered to be advantageous embodiments of the second inventive aspect.

BRIEF DESCRIPTION OF THE DRAWINGS

Other features of the present invention will become apparent from the claims, the exemplary embodiments, and from the drawings. The aforementioned features and feature combinations, as well as the features and feature combinations mentioned in the exemplary embodiments, may be used not only in the particular stated combination, but also in other combinations, without departing from the scope of the present invention. In the drawing.

DETAILED DESCRIPTION

Figure 1:
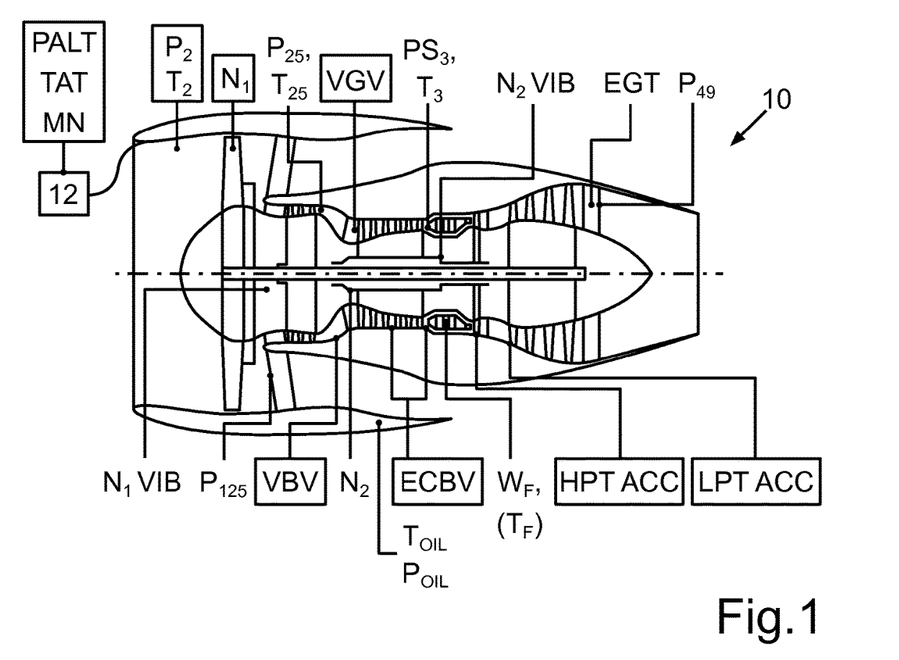
FIG. 1 shows a schematic cross section through an engine on which different parameters are measured for determining a first and a second performance parameter.

FIG. 1 shows a schematic cross section through a generally known aircraft engine 10 on which different parameters are measured for determining a first performance parameter $Y_{pre}$ and a second performance parameter $Y_{post}$. First performance parameter $Y_{pre}$ characterizes an engine performance before an engine maintenance procedure, while second performance parameter $Y_{post}$ characterizes an engine performance after an engine maintenance procedure. These performance parameters $Y_{pre}$, $Y_{post}$ may be determined based on on-wing data collected by a monitoring system 12 (monitoring tool) of engine 10 during the operation of engine 10. This data includes performance-relevant parameters, such as pressures, temperatures, rotational speeds, flight Mach number, fuel mass flow, and the like. Alternatively or additionally, it is possible to use data from a test stand, for example when the engine has been removed from a wing of an aircraft or from a helicopter. After maintenance, second performance parameter $Y_{post}$ is determined during an acceptance test which is mandatory in order to document the maintenance result. If the on-wing data is not available or not sufficiently accurate, an additional test run may be scheduled to be performed before maintenance for data generation purposes in order to determine performance parameter $Y_{pre}$. The recorded parameters are basically the same as in the on-wing case; only the air mass flow of engine 10 is measured instead of the flight Mach number.

Depending on the type and configuration of engine 10, different parameters may be measured to determine first performance parameter $Y_{pre}$ and second performance parameter $Y_{post}$. Preferably, at least the following measurement values are used to determine first performance parameter $Y_{pre}$ and second performance parameter $Y_{post}$:

N1, N2 rotational speeds of the low-pressure and high-pressure compressor shafts
WF, TF: fuel mass flow and fuel temperature
EGT: exhaust gas temperature, measured upstream and downstream of the low-pressure turbine (depending on the engine type).

In the case of the present engine 10, the following parameters may additionally be measured, either alone or in any combination, in order to determine first performance parameter $Y_{pre}$ and second performance parameter $Y_{post}$ even more accurately:

P2, T2: pressure and temperature at the engine inlet (upstream of the fan)
P25, T25: pressure and temperature between the low-pressure compressor/booster and the high-pressure compressor
PS3, T3: static pressure and total temperature between the high-pressure compressor and the combustion chamber
P125: pressure downstream of the fan
P49: pressure downstream of the low-pressure turbine
VBV: position of the variable bleed valve
VGV: position of the variable guide vanes
ECBV: position of the environmental control bleed valve
HPT ACC, LPT ACC: active clearance control position for the high pressure turbine and the low pressure turbine
N1 VIB, N2 VIB: vibration measurement at the low-pressure and high-pressure compressor shafts
Toil, Poil: temperature and pressure in the oil system of the engine Further parameters which concern the aircraft associated with engine 10 and may, in principle, also be taken into account in the determination are:

PALT (pressure altitude)
TAT (total air temperature)
MN (flight Mach number).

In the case of an off-wing measurement on a performance test stand, the air mass flow is measured instead of the flight Mach number as a parameter. It is preferred to use basically the same parameters for determining first performance parameter $Y_{pre}$ and second performance parameter $Y_{post}$, at least for a particular maintenance procedure.

During an engine maintenance procedure, it is possible, in principle, to perform different maintenance and repair measures which, depending on their type and scope, provide different contributions to an overall improvement in engine performance, which manifests itself by a difference between first performance parameter $Y_{pre}$ and second performance parameter $Y_{post}$. The difference between first performance parameter $Y_{pre}$ and second performance parameter $Y_{post}$ may be expressed, for example, as a change in efficiency $\Delta\eta$ of the engine resulting from the maintenance measures performed. In order to be able to determine, prior to the maintenance of engine 10, the maintenance measures that are necessary, for example, to achieve or restore a specific minimum engine performance, a functional relationship between individual maintenance measures and their respective potential for increasing the engine performance is determined The type and scope of a specific maintenance measure performed on engine 10 during engine maintenance are characterized by an associated maintenance parameter X or $\Delta$X Depending on the maintenance measure, maintenance parameter X or $\Delta$X may characterize the change in a feature, such as, for example, the change in a tip clearance, in a surface roughness, in a leading edge radius, or in a chord length of a blade resulting from the maintenance. Furthermore, maintenance parameter X may characterize measures for restoring features. For example, maintenance parameter X may characterize the information that a certain portion (e.g. 50%) of the rotor blades of the 2nd stage of engine 10 were or are to be polished. The number of cycles that a component has operated since the previous maintenance may also be used for the description of the condition of engine 10 before maintenance in order to determine maintenance parameter or parameters X.

In order to determine the functional relationship between a particular maintenance parameter X or $\Delta$X and the contribution of maintenance parameter X or $\Delta$X to a difference between first performance parameter $Y_{pre}$ and second performance parameter $Y_{post}$, it is possible to use mathematical functions which are based on physical considerations. For example, the functional relationship between a change in clearance ($\Delta X = \Delta c$) and a resulting change in efficiency $\Delta\eta$ may be linearly approximated using a constant $c_{clearance}$:

$$\Delta\eta = c_{clearance} * \Delta c$$

Alternatively, more complex functional relationships may also be used, depending on the maintenance measure. It may also be provided that the functional relationship between a particular maintenance measure and its effect on the turbine performance be determined, for example without hypotheses, as a polynomial model, as an exponential model, or based on a stochastic model.

Figure 2:
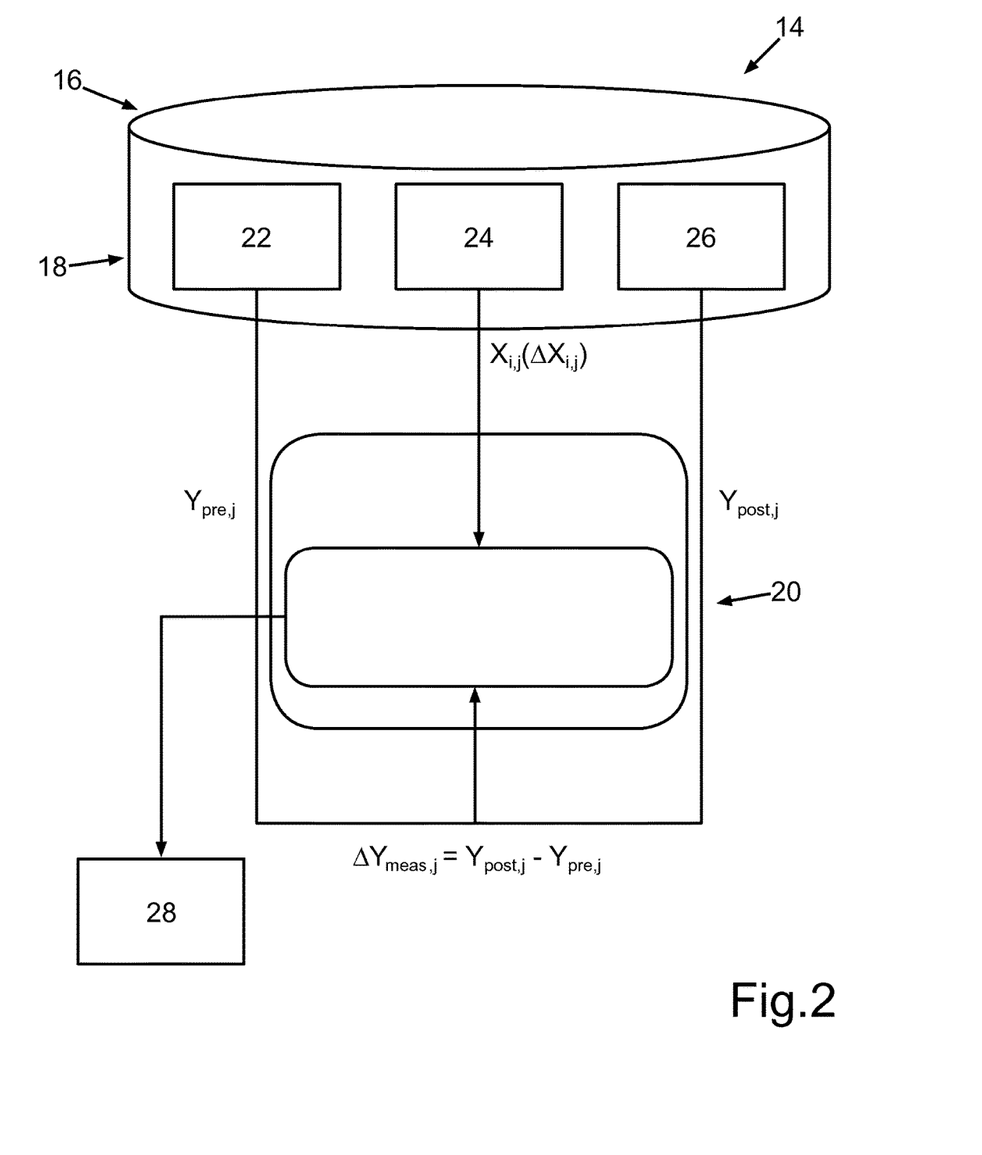
FIG. 2 shows a flow chart for determining a functional relationship between different maintenance parameters and their respective contribution to a difference between an engine performance before an engine maintenance procedure and an engine performance after an engine maintenance procedure.

For further illustration, FIG. 2 shows a flow chart for determining a functional relationship between different maintenance parameters $X_{i,j}$ and their respective contribution to a difference between an engine performance before an engine maintenance procedure and an engine performance after an engine maintenance procedure. Depending on the associated maintenance measure, the maintenance parameter may characterize a scope of a particular maintenance measure and, accordingly, may also be referred to as $\Delta X_{i,j}$.

Initially, an engine maintenance system 14 is provided which includes a database system 16 having a database 18 and a database management device 20. In FIG. 2, $Y_{pre}$: denotes the performance parameter before maintenance
$Y_{post}$: denotes the performance parameter after maintenance
X: designates a maintenance/condition parameter $a_i$: denotes a function parameter
i: is a running index denoting different maintenance measures
j: is a running index for different engines in the database.

Database 18 contains on-wing and/or test stand data 22, which is measured on engine 10 prior to performing the maintenance and used for determining first performance parameter $Y_{pre,j}$ for the present engine j. Database 18 further contains data 24 characterizing the scope of maintenance. The scope of maintenance may be described by the degree of restoration of a feature or component of a stage of engine 10 according to the following formula:

$$\xi_{j,k} = \frac{\sum_m N_{j,k,m}}{N_{j,tot}}$$

where:
ξ: denotes the scope of maintenance
j: designates the engine stage
k: denotes the feature/component
m designates the maintenance measure (repair/replacement)
N: is the number of parts For the sake of simplification, the scope of maintenance may be determined for a plurality of stages of an engine 10 together; i.e., as a cluster, according to the following formula:

$$\xi_k = \frac{\sum_{j}^{n} 1\xi_{j,k}}{n}.$$

where n denotes the number of engine stages.

Possible data sources for determining the scope of maintenance are, for example, planning records of previous maintenance scopes, records of the spare parts that were needed for previous maintenance procedures, records of the manufacturing data of engine 10, or data from modification tracking systems. Moreover, database 18 contains on-wing and/or test stand data 26 of engine 10 after completion of the maintenance procedure, from which second performance parameter $Y_{post,j}$ is determined for the present engine j. With reference to engine j, maintenance parameters $X_{i,j}$ ($\Delta X_{i,j}$) are determined from data 24 for each of the maintenance measures and used by database management device 20 to determine a functional relationship $$\Delta Y_{model,j} = f(X_{i,j}, a_i)$$

between the individual maintenance parameters $X_{i,j}$ ($\Delta X_{i,j}$) and the contribution of each maintenance parameter $X_{i,j}$ ($\Delta X_{i,j}$) to a difference $\Delta Y_{model,j}$ between first performance parameter $Y_{pre}$ and second performance parameter $Y_{post}$. Subsequently, database management device 20 performs a compensation calculation in which a difference $\Delta Y_{meas,j} = Y_{post,j} - Y_{pre,j}$ between performance parameters $Y_{pre,j}$, $Y_{post,j}$ is determined for engine j. This difference $\Delta Y_{meas,j}$ is then used to perform a compensation calculation in which all coefficients $a_i$ of the computed functional relationship $\Delta Y_{model,j}$ are optimized in such a way that it holds that:

$$\varepsilon = \sum_j \Delta Y_{meas,j} - \Delta Y_{model,j} \stackrel{!}{\to} \min$$

This may be done using, for example, the method of least squares. The result may then be output to maintenance personnel via an output device 28, and taken into account accordingly in the maintenance of future engines 10.

Figure 3:
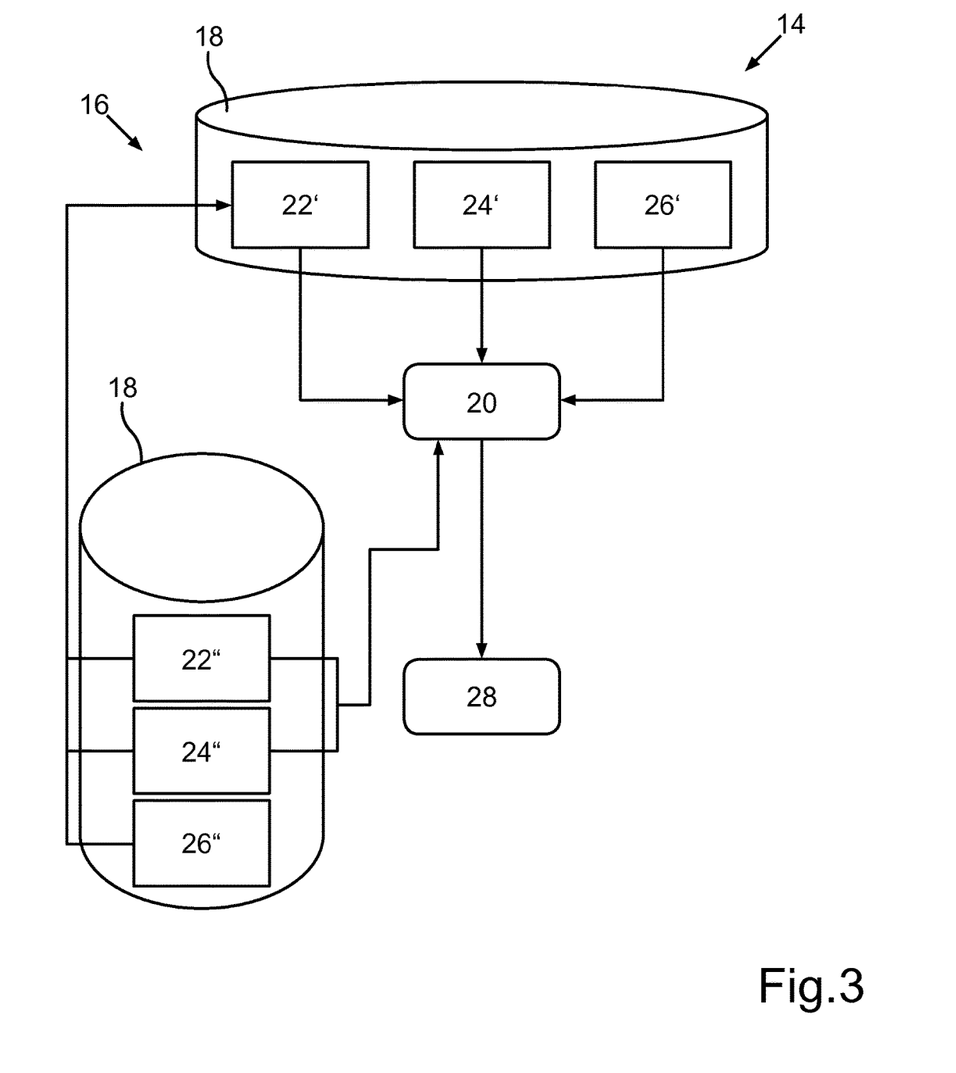
FIG. 3 shows an alternative flow chart for determining a functional relationship between different maintenance parameters and their respective contribution to a difference between an engine performance before an engine maintenance procedure and an engine performance after a maintenance procedure.

FIG. 3 shows an alternative flow chart for determining a functional relationship $\Delta Y_{model}$ between different maintenance parameters $X_{i,j}$ ($\Delta X_{i,j}$) and their respective contribution to a difference $\Delta Y_{meas,j}$ between an engine performance before an engine maintenance procedure and an engine performance after a maintenance procedure. In contrast to the preceding exemplary embodiment, database 18 includes above-described data 22', 24', 26' from previous maintenance procedures on the same or other engines 10. In addition, database 18 includes data 22', 24', 26' obtained based on the engine 10 that is currently to be serviced. Based on the historical data 22', 24', 26' and the currently determined data 22" and 24", database management device 20 determines the effects of individual maintenance measures on the expected overall effect on the engine performance, and outputs the same to maintenance personnel via output device 28. This enables selective planning and performing of the scope of maintenance, because it is possible to select only the most efficient maintenance measures which, considering, for example, the costs of the individual maintenance measures, provide the best cost/performance ratio for restoring a minimum engine performance. Alternatively or additionally, further aspects, such as, for example, the expected number of cycles of certain components, ensuring a minimum engine performance up to a certain point in time, and the like, may be taken into account in the planning and performance of maintenance. The data 22", 24" determined before maintenance and the data 26" determined after maintenance are also stored in database 18, so that the data content of database 18 is continuously increased and a self-learning prediction model is obtained.

As mentioned earlier, different mathematical models may be used as a basis for characterizing individual maintenance measures. For example, based on literature data, a mathematical model of the deterioration of a feature can be described according to the formula $$\Delta X_k = a_k * t^{1/\kappa_k}$$

Together with the following formula:

$$\Delta \eta_k = b_k * \Delta X_k$$

for describing the effect of this feature on the engine's efficiency, the following formula can be derived:

$$\Delta \eta_k = \alpha_k * 10 * \xi_k * \max(t/1000 - t0_k; 0)^{1/\kappa_k}$$

where:
a: coefficient for the rate of deterioration
κ: coefficient for the deterioration curve (qualitative)
α: coefficient for the rate of performance loss
t0: beginning of the decrease in performance (in cycles or flight hours)

Based on this formula, it is possible to predict the number of cycles (t) after which, starting from the base value or the beginning of the decrease in performance (t0), aging; i.e., a deterioration in engine efficiency, is to be expected due to the respective feature/component. By adding up all features for all considered engine stages according to the formula $$\Delta \eta_{tot} = \sum_k \Delta \eta_k$$

it is possible to predict and plan the overall maintenance requirements of the engine. Table 1 exemplarily shows optimized correlation factors regarding the efficiency of different maintenance measures on components of a high-pressure compressor with respect to the resulting increase in engine efficiency. It can be seen that different maintenance measures differ in their effectiveness for the improvement in efficiency.

TABLE 1

| | Restoration of the ... | | | | | | | |
|---|---|---|---|---|---|---|---|---|
| | blade clearance by a maintenance measure on the blade tip(s) (tip clearance, blade tip) | | blade clearance by a maintenance measure on the casing liner (tip clearance, casing liner) | | blade contour | | surface roughness | |
| | front | rear | Front | rear | front | rear | front | rear |
| α | 0.53 | 0.27 | 0.03 | 0.34 | 0.58 | 0.09 | 1.00 | 0.38 |
| t0 | 0.30 | 0.70 | 0.30 | 0.08 | 0.27 | 0.68 | 0.19 | 0.41 |
| κ | 5.62 | 5.84 | 7.63 | 7.33 | 6.10 | 5.21 | 6.17 | 6.62 |

Figure 4:
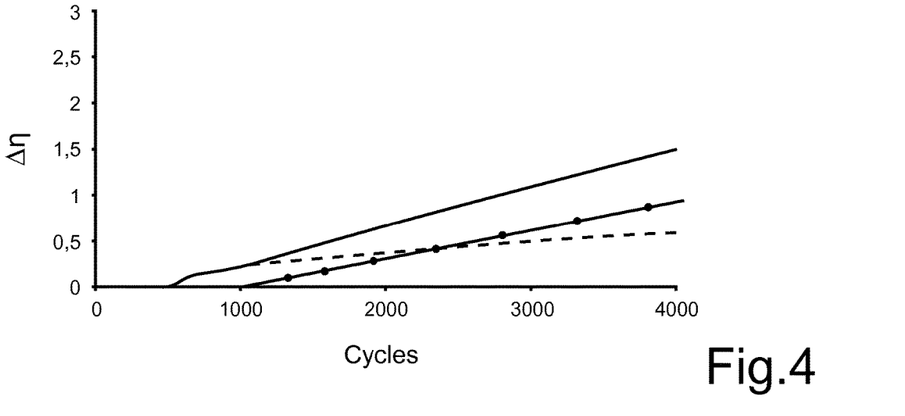
FIG. 4 shows a diagram in which the potential of two maintenance measures for engine performance improvement is plotted as a function of a number of cycles of a component.

FIG. 4 shows a diagram in which the potential of two maintenance measures for engine performance improvement is plotted as a function of a number of cycles of a blade of engine 10. The number of cycles of the blade is plotted on the axis of abscissas, while the difference between the engine performance before and after maintenance is plotted on the axis of ordinates. The dot-dash line describes the effect of the maintenance measure "restore blade clearance", while the dashed line describes the effect of the maintenance measure "restore desired surface roughness" on the engine performance as a function of the number of cycles of the blade. The solid line represents the combined overall potential of both maintenance measures. It can be seen that the effects of the two maintenance measures on the improvement of the engine performance vary as a function of the number of cycles, and that for higher numbers of cycles, the maintenance measure "restore blade clearance" has greater effects on the efficiency than the maintenance measure "restore desired surface roughness".

Figure 5:
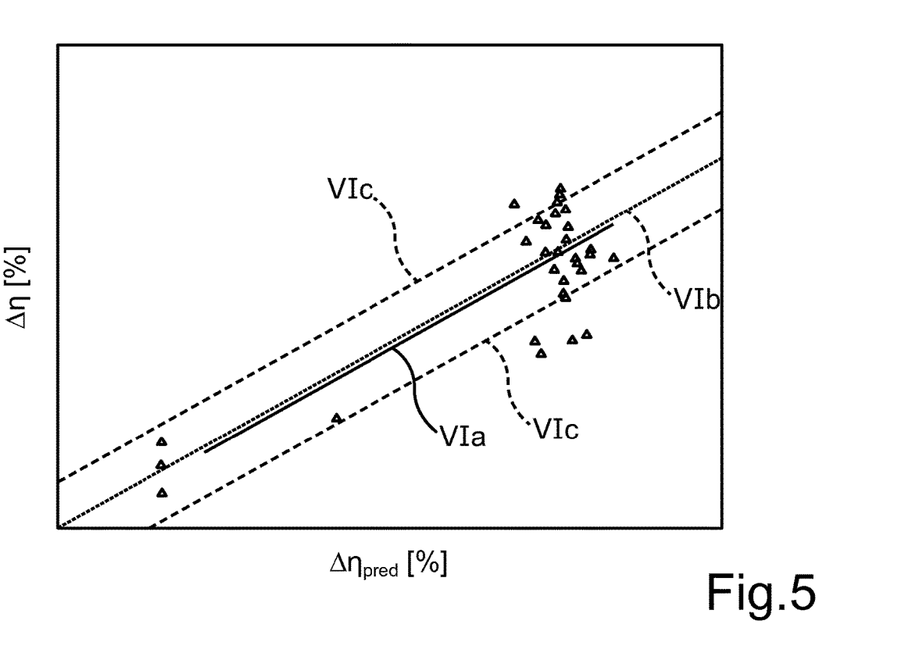
FIG. 5 shows a comparison between measured changes in efficiency of serviced engines and efficiency changes which were calculated based on the determined functional relationship.

FIG. 5 shows a diagram in which measured efficiency changes Δη of serviced engines are plotted in percent on the ordinate and the efficiency changes $\Delta\eta_{pred}$ of serviced engines which are calculated based on determined functional relationships of individual maintenance measures are plotted in percent on the abscissa. Solid line VIa represents a fit with a linear relationship of the data points shown as triangles. Dotted line VIb illustrates the relationship as a linear trend model, while dashed lines VIc bound the confidence interval for the analysis of the performance parameters (95% probability). The high predictive power of the determined functional relationships is readily apparent.

The parameter values given in the documents for defining process and measurement conditions for the characterization of specific properties of the subject matter of the present invention are to be considered as within the scope of the present invention, even in the context of deviations, e.g., due to measurement errors, system errors, weighing errors, DIN tolerances, and the like.

What is claimed is:

1. A method for performing maintenance on an engine, comprising the steps of:
provimmg an engine maintenance system including a database system having a database and a database management device;
providing at least one first performance parameter stored in the database and characterizing an engine performance before an engine maintenance procedure;
providing at least one maintenance parameter stored in the database and characterizing a scope of a maintenance measure performed on the engine during the engine maintenance procedure;
providing at least one second performance parameter stored in the database and characterizing the engine performance after the engine maintenance procedure;
determining, using the database management device, a functional relationship between the maintenance parameter and the contribution of the maintenance parameter to a difference between the first performance parameter and the second performance parameter;
outputting the functional relationship via the engine maintenance system; and
performing maintenance on the engine taking the functional relationship into account;
wherein the functional relationship comprises $\Delta Y_{model,j} = f(X_{i,j}, a_i)$ wherein $\Delta Y_{model,j}$ is a difference between the first and second performance parameters for an engine j;
wherein $X_{i,j}$ is a maintenance parameter for a maintenance measure i and the engine j; and
wherein $a_i$ is a function parameter for the maintenance measure i.

2. The method as recited in claim 1 wherein the first performance parameter or the second performance parameter is determined using a monitoring system of the engine or using a performance test stand and is stored in the database.

3. The method as recited in claim 2 wherein the first performance parameter or the second performance parameter is determined taking into account at least one parameter selected from the group of height, pressure, temperature, rotational speed, fuel mass flow, flight Mach number, air mass flow, efficiency, capacity, valve position, guide vane angle, clearance-maintaining position and vibrations in the turbine region of the engine or in a compressor of the engine.

4. The method as recited in claim 2 wherein the at least one maintenance parameter characterizes a degree of a change in a feature of a component of the engine resulting from the maintenance measure or a degree of restoration of a feature of a component of the engine resulting from the maintenance measure or is determined taking into account a number of cycles that a component to be serviced of the engine has operated since a previous maintenance of the engine.

5. The method as recited in claim 2 wherein the first performance parameter or the second performance parameter or the maintenance parameter is available in the form of data of an already serviced engine stored in the database or is acquired on the engine to be serviced and stored in the database.

6. The method as recited in claim 2 wherein the first performance parameter or the second performance parameter or the maintenance parameter is provided in relation to a type or a specimen or a stage or a stage cluster of the engine.

7. The method as recited in claim 2 wherein the functional relationship is determining by a compensation calculation.

8. The method as recited in claim 2 wherein the functional relationship is determined for a plurality of maintenance parameters.

9. The engine maintenance system for the method as recited in claim 2, comprising:
   a database system including:
      a database adapted to store at least one first performance parameter characterizing an engine performance before an engine maintenance procedure, at least one maintenance parameter characterizing a scope of a maintenance measure performed on an engine during an engine overhaul, and at least one second performance parameter characterizing the engine performance after the engine maintenance procedure; and
      a database management device adapted to access the database and to determine a functional relationship between the at least one maintenance parameter and the contribution of the maintenance parameter to the difference between the first performance parameter and the second performance parameter; and
   an output device for outputting the functional relationship determined by the database management device in order for it to be taken into account in the maintenance of the engine.

10. The method as recited in claim 7 wherein the compensation calculation determines the functional relationship, the functional relationship being between a change in a clearance of a blade and an associated increase in engine efficiency.

11. The method as recited in claim 7 wherein the compensation calculation determines a linear relationship between a change in a clearance of a blade and an associated increase in engine efficiency as the functional relationship.

12. The method as recited in claim 10 wherein the linear relationship is approximated using a constant.

13. The method as recited in claim 1 wherein the functional relationship is between a change in clearance of a blade and an associated increase in engine efficiency.

14. The method as recited in claim 1 wherein the functional relationship is determined as a polynomial model, exponential model or is based on a stochastic model.

15. The method as recited in claim 1, wherein the maintenance parameter is a change in a tip clearance, a change in a surface roughness, a change in a leading edge radius or a change in a chord length of a blade resulting from the engine maintenance procedure.

16. The method as recited in claim 4, wherein the maintenance parameter is a change in a tip clearance, a change in a surface roughness, a change in a leading edge radius or a change in a chord length of a blade resulting from the engine maintenance procedure.

17. The method as recited in claim 1, wherein the maintenance parameter includes information that a certain portion of a plurality of rotor blades of the engine were or are to be polished during the engine maintenance procedure.

18. The method as recited in claim 4, wherein the maintenance parameter includes information that a certain portion of a plurality of rotor blades of the engine were or are to be polished during the engine maintenance procedure.

19. The method as recited in claim 16,
   wherein the at least one first performance parameter characterizing an engine performance before an engine maintenance procedure is fuel mass flow before the engine maintenance procedure and wherein
   the at least one second performance parameter characterizing the engine performance after the engine maintenance procedure is fuel mass flow after the engine maintenance procedure.

20. A method for performing maintenance on an engine, comprising the steps of:
   providing an engine maintenance system including a database system having a database and a database management device;
   providing at least one first performance parameter stored in the database and characterizing an engine performance before an engine maintenance procedure;
   providing at least one maintenance parameter stored in the database and characterizing a scope of a maintenance measure performed on the engine during the engine maintenance procedure;
   providing at least one second performance parameter stored in the database and characterizing the engine performance after the engine maintenance procedure;
   determining, using the database management device, a functional relationship between the maintenance parameter and the contribution of the maintenance parameter to a difference between the first performance parameter and the second performance parameter;
   outputting the functional relationship via the engine maintenance system; and
   performing maintenance on the engine taking the functional relationship into account;
   wherein the at least one maintenance parameter characterizes a degree of a change in a feature of a component of the engine resulting from the maintenance measure or a degree of restoration of a feature of a component of the engine resulting from the maintenance measure or is determined taking into account a number of cycles that a component to be serviced of the engine has operated since a previous maintenance of the engine;
   wherein the maintenance parameter is a change in a tip clearance, a change in a surface roughness, a change in a leading edge radius or a change in a chord length of a blade resulting from the engine maintenance procedure;
   wherein the at least one first performance parameter characterizing an engine performance before an engine maintenance procedure is exhaust gas temperature before the engine maintenance procedure; and
      wherein the at least one second performance parameter characterizing the engine performance after the engine maintenance procedure is fuel exhaust gas temperature after the engine maintenance procedure.

* * * * *